US009747606B2

(12) United States Patent
Stoulil

(10) Patent No.: US 9,747,606 B2
(45) Date of Patent: Aug. 29, 2017

(54) SYSTEMS AND METHODS FOR TARGETED ADVERTISING ON FOOD AND BEVERAGE PREPARATION AND DISPENSING MACHINES

(75) Inventor: Ryan Stoulil, Edmonds, WA (US)

(73) Assignee: BREAK ROOM MEDIA LLC, Edmonds, WA (US)

( * ) Notice: Subject to any disclaimer, the term of this patent is extended or adjusted under 35 U.S.C. 154(b) by 1341 days.

(21) Appl. No.: 13/016,821

(22) Filed: Jan. 28, 2011

(65) Prior Publication Data

US 2011/0184812 A1   Jul. 28, 2011

Related U.S. Application Data

(60) Provisional application No. 61/299,316, filed on Jan. 28, 2010, provisional application No. 61/408,499, filed on Oct. 29, 2010.

(51) Int. Cl.
*G06Q 30/00* (2012.01)
*G06Q 30/02* (2012.01)
*G07F 9/02* (2006.01)

(52) U.S. Cl.
CPC ......... *G06Q 30/02* (2013.01); *G06Q 30/0251* (2013.01); *G06Q 30/0269* (2013.01); *G07F 9/02* (2013.01)

(58) Field of Classification Search
None
See application file for complete search history.

(56) References Cited

U.S. PATENT DOCUMENTS

| 5,134,716 A | 7/1992 | Craig .............................. 455/66 |
| 5,822,216 A | 10/1998 | Satchell, Jr. et al. .... 364/479.01 |
| 5,908,142 A | 6/1999 | Sacchetti ........................ 222/25 |
| 6,148,553 A | 11/2000 | Billet ............................. 40/538 |

(Continued)

FOREIGN PATENT DOCUMENTS

EP   2 071 534 A1   6/2009

OTHER PUBLICATIONS http://www.vendingmarketwatch.com/article/10273009/video-screens-give-vending-machines-new-capabilities.*

(Continued)

*Primary Examiner* — William A Brandenburg
*Assistant Examiner* — Christopher Busch
(74) *Attorney, Agent, or Firm* — Seed IP Law Group LLP

(57) ABSTRACT

Providing targeted advertising on food/beverage preparation or dispensing machines may include electronically presenting selected targeted media on or in proximity to a food/beverage preparation or dispensing machine. This may involve automatically activating consumable item preparation or dispensing mechanisms of the food/beverage preparation or dispensing machine, or activating an item selection menu, in conjunction with electronically presenting the selected media. The targeted advertising may be based on receiving user input such as information identifying a particular user or consumer or menu selections and then selecting the selected media based on the received user input. User interface elements may also be provided enabling a user to request additional information regarding selected targeted media be electronically sent to them or an order be placed for a related product. Compensation to a user or another entity may be activated each time the selected media is played.

36 Claims, 11 Drawing Sheets

(56) References Cited

U.S. PATENT DOCUMENTS

| | | | |
|---|---|---|---|
| 6,152,591 A | 11/2000 | McCall et al. | 364/479.01 |
| 6,238,721 B1 | 5/2001 | Knepler | 426/590 |
| 6,465,035 B1 | 10/2002 | Knepler | 426/590 |
| 6,479,086 B1 | 11/2002 | Knepler | 426/231 |
| 6,658,323 B2 | 12/2003 | Tedesco et al. | 700/236 |
| 7,107,231 B1 * | 9/2006 | Hall | G06Q 30/02 705/14.27 |
| 7,158,918 B2 | 1/2007 | Bunn et al. | 702/182 |
| 7,162,391 B2 | 1/2007 | Knepler et al. | 702/182 |
| 7,223,427 B2 | 5/2007 | Knepler | 426/231 |
| 7,673,555 B2 | 3/2010 | Nosler et al. | 99/279 |
| 8,191,779 B2 | 6/2012 | Illingworth et al. | |
| 2002/0138433 A1 * | 9/2002 | Black | G06Q 20/1085 705/43 |
| 2003/0055735 A1 * | 3/2003 | Cameron | G06Q 20/04 705/27.1 |
| 2003/0079612 A1 * | 5/2003 | Con | A47J 31/4485 99/275 |
| 2005/0096977 A1 * | 5/2005 | Rossides | G06Q 30/0212 705/14.14 |
| 2005/0211768 A1 | 9/2005 | Stillman | 235/381 |
| 2006/0092094 A1 | 5/2006 | Kennedy et al. | 345/1.1 |
| 2007/0100696 A1 * | 5/2007 | Illingworth | G06Q 30/0268 705/14.65 |
| 2007/0241120 A1 | 10/2007 | Henry | 221/2 |
| 2009/0014466 A1 | 1/2009 | Saveliev et al. | 222/1 |
| 2009/0216490 A1 | 8/2009 | Knepler et al. | 702/182 |

OTHER PUBLICATIONS

United Food Group web video link emailed to Applicant on Sep. 7, 2010, www.unitedfoodgroup.net/psvd.htm, 7 pages.
International Search Report, mailed Mar. 21, 2011 for PCT/US2011/023043, 4 pages.
Written Opinion, mailed Mar. 21, 2011 for PCT/US2011/023043, 6 pages.
International Preliminary Report on Patentability mailed Jul. 31, 2012, for PCT/US2011/023043, 7 pages.

* cited by examiner

SYSTEMS AND METHODS FOR TARGETED ADVERTISING ON FOOD AND BEVERAGE PREPARATION AND DISPENSING MACHINES

CROSS-REFERENCE TO RELATED APPLICATIONS

This application claims the benefit under 35 U.S.C. §119(e) of U.S. Provisional Patent Application No. 61/299,316, filed on Jan. 28, 2010 and U.S. Provisional Patent Application No. 61/408,499, filed on Oct. 29, 2010. Each of these two provisional applications is incorporated herein by reference in its entirety.

BACKGROUND

Technical Field

This disclosure generally relates to advertising, and particularly to targeted advertising.

Description of the Related Art

Advertising on traditional media outlets such as television, radio, the World Wide Web (web), printed publications and public signage is often directed to a general audience and thus less valuable, or is provided to the potential consumer during times in which they are inclined to avoid the advertisements (e.g., by changing or muting the TV channel or radio station, clicking close on the web advertisement, turning the page in a printed publication, or just walking by a sign without noticing it). Also, the potential consumer often has no immediate incentive to view or listen to the advertisement and is therefore more inclined to avoid it if at all possible.

BRIEF SUMMARY

Advertisers would benefit from opportunities to provide an immediate advertisement viewing or listening incentive to a relatively captive and identified group of potential consumers whose tastes and likes are known.

A method for providing advertising may be summarized as including receiving input from a user or from a device of the user; automatically selecting media to be presented to the user based on the received input; electronically presenting the selected media; and automatically activating one or more consumable item preparation or dispensing mechanisms, or a consumable item selection menu, at least partially concurrently with the electronically presenting the selected media. The automatically activating consumable item preparation or dispensing mechanisms, or the consumable item selection menu, may be based on the received input. The automatically activating the one or more consumable item preparation or dispensing mechanisms, or the consumable item selection menu, may be triggered by the electronically presenting the selected media. The method may include automatically activating consumable item preparation or dispensing mechanisms and timing the presenting of the selected media to occur during the consumable item preparation or dispensing and the presenting of the selected media may be caused by the activating the one or more consumable item preparation or dispensing mechanisms. The consumable item preparation or dispensing mechanisms may initiate preparation of a beverage. The electronically presenting the selected media may include delivering an advertisement and may further include recording an occurrence of the delivery of the advertisement. The method may further include automatically activating delivery of compensation for the delivering of the advertisement. The automatically activating delivery of compensation may include automatically communicating information regarding the occurrence of the delivery of the advertisement to enable a system to correlate the occurrence of the delivery of the advertisement with an amount of compensation. The method may further include communicating along with the information regarding the occurrence of the delivery of the advertisement information identifying a user to which the advertisement was delivered. The automatically communicating information regarding the occurrence of the delivery of the advertisement may include communicating the information regarding the occurrence of the delivery of the advertisement to an entity associated with placing the advertisement. The method may further include monitoring the user's attention to the advertisement delivered and determining an amount of the compensation based on a level of attention resulting from the monitoring. The input may be received at a food or beverage preparation or dispensing machine. The electronically presenting the selected media may occur on a display of the food or beverage preparation or dispensing machine. The electronically presenting the selected media may occur on a display in close proximity to the food or beverage preparation or dispensing machine. The display in close proximity to the food or beverage preparation or dispensing machine may be a display of a wireless device of the user. The electronically presenting the selected media may occur on a display of the food or beverage preparation or dispensing machine or on a display in close proximity to the food or beverage preparation or dispensing machine, and the input may be received at a device remote from the food or beverage preparation or dispensing machine. The selecting media to be played based on received input may include receiving information identifying a user; retrieving user profile information based on the input identifying the user; and selecting the media to be played based on the retrieved user profile information. The method may further include displaying a subset of beverage or food choice menu selections, the subset being a portion of possible beverage or food choice menu selections determined based on the retrieved user profile information. The received input may include a menu selection of media topics or a menu selection of food or beverages. The electronically presenting the selected media may include concurrently displaying a plurality of separate media pieces on one or more displays that are associated with a food or beverage preparation or dispensing machine. The plurality of separate media pieces may include at least one advertisement and at least one other type of media. The method may further include providing, on a user interface, a user selectable element associated with one of the plurality of separate media pieces that, when selected by a user, causes information related to the one of the plurality of separate media pieces to be electronically communicated to a device remote from the food or beverage preparation or dispensing machine. The device remote from the food or beverage preparation or dispensing machine may be a mobile device of the user. The information related to the one of the plurality of separate media pieces may include an order for an item related to the one of the plurality of separate media pieces.

A food or beverage preparation or dispensing machine may be summarized as including means for electronically presenting selected media; and means for automatically activating consumable item preparation or dispensing mechanisms, or an item selection menu, in conjunction with the electronically presenting the selected media.

The means for automatically activating one or more consumable item preparation or dispensing mechanisms, or a consumable item selection menu, at least partially concurrently with the electronically presenting the selected media, may include at least one processor; food or beverage preparation or dispensing mechanisms in operable communication with the processor; at least one non-transitory memory operably coupled to the at least one processor; and a multimedia output or peripheral interface in operable communication with the at least one processor, wherein the memory has computer executable instructions thereon, that when executed, cause the processor to perform: automatically activating consumable item preparation or dispensing mechanisms, or a consumable item selection menu, at least partially concurrently with electronically presenting selected media based on input. The presenting the selected media may occur during consumable item preparation or dispensing caused by activating the consumable item preparation or dispensing mechanisms. The computer executable instructions, when executed, may cause the processor to select the selected media based on input by: receiving information identifying a user; retrieving user profile information based on the input identifying the user; and selecting the media to be played based on the retrieved user profile information. The retrieving user profile information may include retrieving user profile information from a device remote from the food or beverage preparation or dispensing machine.

A non-transitory computer readable medium may be summarized as including having computer executable instructions thereon, that when executed, cause a computer processor to perform: electronically presenting selected media; and automatically activating one or more consumable item preparation or dispensing mechanisms, or a consumable item selection menu, at least partially concurrently with the electronically presenting the selected media. The electronically presenting the selected media may include concurrently displaying a plurality of separate media pieces on one or more displays that are associated with a food or beverage preparation or dispensing machine. The plurality of separate media pieces may include at least one advertisement and at least one other type of media. Automatically activating the item selection menu may include providing, on a user interface, a user selectable element associated with one of the plurality of separate media pieces that, when selected by a user, causes information related to the one of the plurality of separate media pieces to be electronically communicated to a device remote from the food or beverage preparation or dispensing machine. The computer-executable instructions, when executed, may further cause the computer processor to: receive input; and select the selected media based on the received input.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
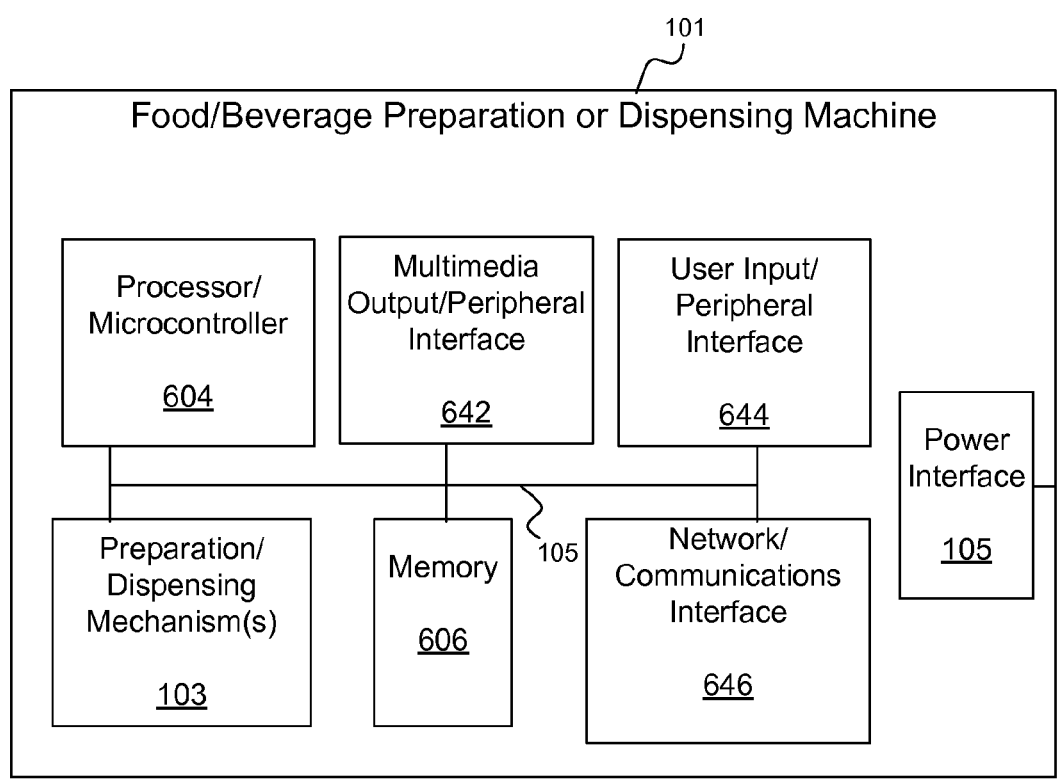
FIG. 1 is block diagram illustrating various components of an example food/beverage preparation or dispensing machine for providing targeted advertising.

In the following detailed description, reference is made to the accompanying drawings, which form a part thereof. In the drawings, similar symbols typically identify similar components, unless context dictates otherwise. The illustrative embodiments described in the detailed description, drawings, are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to systems, devices, methods, processes and computer programs related to targeted advertising on food/beverage preparation or dispensing machines.

FIG. 1 is block diagram illustrating various components of an example food/beverage preparation or dispensing machine 101 for providing targeted advertising. Example operable components within the food/beverage preparation or dispensing machine 101 may include one or more preparation/dispensing mechanisms 102, a processor and/or microcontroller 604, a non-transitory computer readable storage media or memory 606, a multimedia output/peripheral interface 642, a user input/peripheral interface 644, a network/communications interface 646, and a power interface 105. The one or more preparation/dispensing mechanisms 102, processor and/or microcontroller 604, memory 606, multimedia output/peripheral interface 642, user input/peripheral interface 644, and network/communications interface 646 may be in operable communication with each other via an electronic communications bus 105. The power interface 105 (e.g., a transformer or rectifier) interfaces with a power source to provide electrical power sufficient to operate the food/beverage preparation or dispensing machine 101 components described herein.

Operation of the preparation/dispensing mechanisms 103 may be electronically controlled by the processor/microcontroller 604 according to computer executable instructions resident on the processor/microcontroller 604 and/or stored on the memory 606. For example, the microprocessor/controller 604 may control activation of custom preparation and dispensing of liquid or other food items from the food/beverage preparation machine 101. Also, the microprocessor/controller 604 may receive data or other signals from the preparation/dispensing mechanisms 103 to determine when certain operations of the preparation/dispensing mechanisms 103 are beginning, occurring or completed.

The user input/peripheral interface 644 is operable for receiving user input to control the food/beverage preparation or dispensing machine 101 via the processor/microcontroller 604 and such input may also be stored as data in memory 606 for access by the microcontroller/processor 604. The user input/peripheral interface 644 may be operable for receiving, interpreting, translating and/or formatting input from various input structures and peripherals including, but not limited to: buttons, keyboards, keypads, touch screens, touch pads, a mouse, a track ball, voice recognition devices, biometric identification devices, card readers, machine readable symbol scanners, bar code scanners, radio frequency identification (RFID) receivers, personal digital assistants (PDAs), mobile devices, and smart phones, etc. One or more such input structures may be connected as a peripheral device or operably coupled to and integrated into the food/beverage preparation or dispensing machine 101.

The multimedia output/peripheral interface 642 may be controlled by the processor/microcontroller 604 and is operable for providing output to the user in the form of audio, video and still images, for example. Source data for such output may be retrieved from the memory 606 or retrieved remotely from other devices via the network/communications interface 646. For example, streaming audio or video may be communicated to the food/beverage preparation or dispensing machine 101 via the network/communications interface 646 and output by the multimedia output/peripheral interface 642. The multimedia output/peripheral interface 642 may be operable to interface with any number of output devices and be configured to interpret, translate and/or format data and/or process signals to be output on various devices. Such output devices may include but are not limited to display screens, speakers, printers, etc. One or more such output devices may be connected as a peripheral device or operably coupled to and integrated into the food/beverage preparation or dispensing machine 101.

The memory 606 may be one or more of any suitable non-transitory storage devices capable of storing processor-executable instructions including removable storage devices, non-removable storage devices, volatile or non-volatile memory, or a combination thereof. Example suitable storage devices may include, but are not limited to, RAM, ROM, EEPROM, flash memory or other memory technology, CD-ROM, digital versatile disks (DVD) or other optical storage, magnetic cassettes, magnetic tape, magnetic disk storage, hard drives, or other magnetic storage devices, or any other storage medium which may be used to store the desired information and which may be accessed by processor/microcontroller 604. However, use of a non-volatile storage device may be preferable to store data in situations where data is desired to be kept saved even when power is removed from the food/beverage preparation or dispensing machine 101.

The network/communications interface may be controlled by the processor/microcontroller 604 and may be operable for wired or wireless communications with one or more communications and computer networks using one or more network and communications protocols including, but not limited to: the Internet, cellular networks, local area networks (LAN), wide area networks (WAN), satellite networks, short and long range radio networks, Bluetooth® networks, radio frequency identification (RFID), Worldwide Interoperability for Microwave Access (WiMAX), infrared, microwave and/or ultrasonic networks and protocols, etc. Further example communications networks and operation and implementation of the food/beverage preparation or dispensing machine 101 within various communications and computer networks are shown and described below with reference to FIG. 4.

Further detailed examples and descriptions of the various computing devices, components and configurations described herein suitable for controlling, implementing and operating an example food/beverage preparation or dispensing machine 101 for providing targeted advertising are described below with reference to FIG. 6.

Figure 2A:
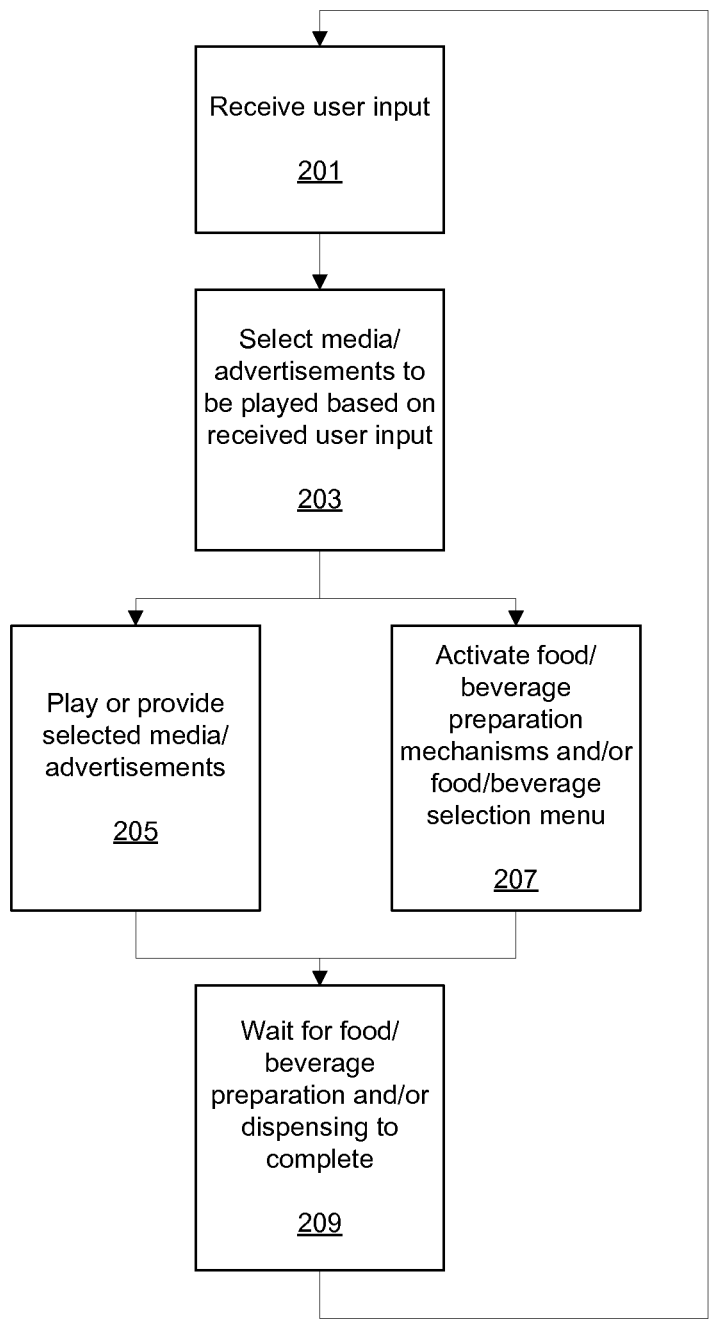
FIG. 2A is a flow chart illustrating an example process for providing targeted advertising on food/beverage preparation or dispensing machines.

Referring next to FIG. 2A, shown is a flow chart illustrating an example process for providing targeted advertising on food/beverage preparation or dispensing machines. The process may be applied to various food/beverage preparation or dispensing machines including but not limited to: coffee and hot beverage brewers and dispensers, soda fountain machines, beverage vending machines, food vending machines, microwave ovens, toaster ovens, etc.

First, user input is received 201 identifying the user or identifying a preference of a user of the food/beverage preparation or dispensing machine 101. Such user input may include, but is not limited to: a user name, password, code or personal identification number (PIN), bar code, voice signals, biometric data, indications of user likes or dislikes, advertising or media preferences, answers to a questionnaire or survey, favorite food, music, and/or movies, favorite celebrities, sports stars and/or artists, demographic information such as age, gender, marital status, occupation, income, place of birth, native language, food and beverage preferences, past food and beverage selections, etc. The user input may be received 201 through a user input device connected to or integrated with the food/beverage preparation or dispensing machine 101 via the user input/peripheral interface 644 of the food/beverage preparation or dispensing machine 101. Also, the user input may be received remotely via the network/communications interface 646 of the food/beverage preparation or dispensing machine 101 or may be received from a mobile or wireless device of the user including a user's cell phone, PDA, smart phone, electronic credit card, or electronic wallet, etc. Information identifying the user (e.g., a PIN, cookie, encrypted key, etc.) may be stored on and communicated from an any of such devices to the food/beverage preparation or dispensing machine 101.

A user may enter or indicate user input using an input device operably connected to or integrated with the food/beverage preparation or dispensing machine 101. The user input may be input via entering data using a keypad, keyboard, touch screen, touch pad, light pen, stylus, mouse, voice activation and/or recognition systems, motion detection and/or recognition systems, etc. Once the user input is received, particular media and/or advertisements are automatically selected 203 to be played or provided on the food/beverage preparation or dispensing machine 101 based on the received user input. For example, if the received user input indicates that the user has a preference for sports, then media and advertisements related to sports, items endorsed by athletes, or items commonly associated with those who prefer sports may be selected 203 to be played on an output device that is connected to or integrated with the food/beverage preparation or dispensing machine 101. Alternatively, the user may be given choices of particular advertisements or media clips to play and selection of the particular media and/or advertisements are based on the user selections of the choices provided.

The selected media and/or advertisements are then played or provided 205 on an output device that is connected to or integrated with the food/beverage preparation or dispensing machine 101 and the food/beverage preparation or dispensing mechanisms 103 are automatically activated 207 according to previous user input received regarding selections of beverages or food items. Alternatively, the food/beverage selection menu is automatically activated 207 to obtain initial or further food or beverage selection options from the user, after which food/beverage preparation or dispensing mechanisms 103 are automatically activated 207. The particular media and/or advertisements may be in the form of audio, video and still images. Also, selected advertisements, coupons or promotions may be printed out from the food/beverage preparation or dispensing machine 101 or sent to the user electronically.

The particular media and/or advertisement content may managed remotely and automatically distributed, updated and communicated to the food/beverage preparation or dispensing machine 101 via the network/communications interface 604. The content may be updated based on user data, user feedback, food and beverage selections, and/or food/beverage preparation or dispensing machine 101 use history also communicated by the food/beverage preparation or dispensing machine 101 via the network/communications interface 604 to remote devices.

The activation 207 of the food/beverage preparation or dispensing mechanisms 102 and/or selection menu is dependent upon receiving 201 the user input and the presenting or providing 205 of the selected media/advertisements. Alternatively, activation 207 of the food/beverage preparation mechanisms and/or dispensing menu may be dependent upon just receiving 201 the user input. As a further alternative embodiment, if user input is not available or the food/beverage preparation and/or dispensing machine 101 is not configured to select and play such targeted media and advertisements based on received user input (i.e., user selections), the activation 207 of the food/beverage preparation or dispensing mechanisms and/or selection menu may be dependent upon presenting standard or randomly selected advertising.

Preferably, the selected media and/or advertisements are played 205 on an output device that is located near where the beverage or food item is being prepared and/or dispensed such that the user may easily listen and/or watch the media and/or advertisements while the beverage or food item is being prepared and/or dispensed. An output device that is integrated with the food/beverage preparation or dispensing machine 101 may facilitate this as the user would then likely be near the output device while waiting for the selected item to be dispensed.

Further graphical user interface menu items for the user to make food and/or beverage selections and preparation choices may be provided on an output device that is connected to or integrated with the food/beverage preparation or dispensing machine 101 before or after other particular user input is received on which media/advertisements selections are based. Also, in an example of using a touch screen as a user input device, the touch screen may also be used as the output device for displaying media and advertisements to the user.

The process then may wait 209 until the food/beverage preparation and/or dispensing is completed as detected by removal of the item or as indicated by other internal preparation/dispensing mechanisms and communicated to the processor/microcontroller 604. The process then returns to a state to receive user input again 201 in order to repeat the process again for dispensing another food item or beverage. Alternatively, if the user selects multiple food items or beverages at one time, the process may select multiple advertisements to play or provide to the user depending on the number (and possibly price) of items selected.

Additionally or alternatively, the food/beverage preparation or dispensing machine 101 may play passive advertising video, audio or images while the machine 101 is in an idle state until a user begins to interact with the machine 101. Also, the food/beverage preparation or dispensing machine 101 may have motion, light or other sensors, or video cameras operably connected to it to detect a user approaching the machine 101 and/or to detect whether and monitor how long a user is watching advertisements or other media being presented. Once a user has been detected approaching the food/beverage preparation or dispensing machine 101 (and possibly identified by automatic facial recognition, radio frequency identification (RFID) scan, or retinal, fingerprint or other biometric data received), the passive advertisements may automatically switch to more personalized advertising content based on the identified user. Alternatively, there may be no advertising playing while the machine is idle and then the passive advertising may be activated once a user approaching is detected via the motion sensor.

The passive advertisements may also be tailored to the environment in which the food/beverage preparation or dispensing machine 101 is being used by selecting passive advertisements based on the history of previous beverage selections, channel selections and user preferences received by the food/beverage preparation or dispensing machine 101.

Figure 2B:
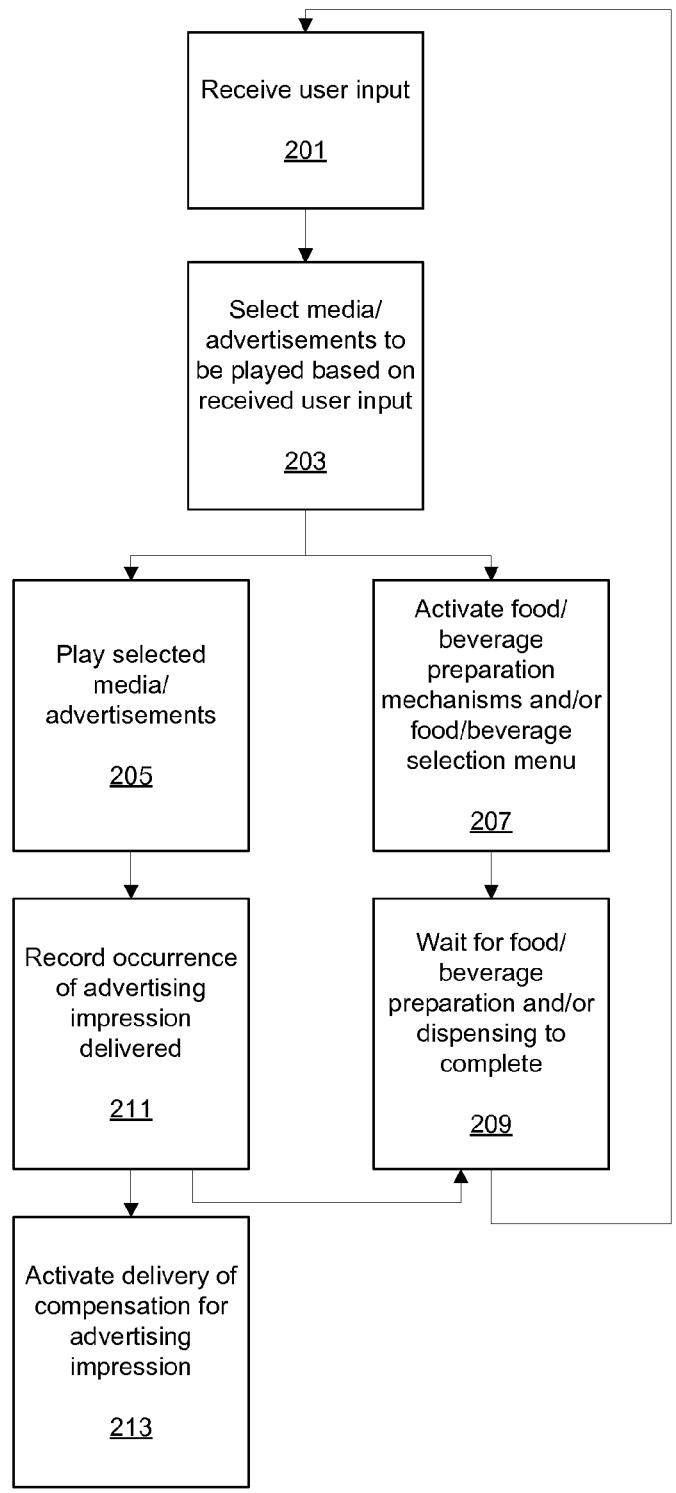
FIG. 2B is a flow chart illustrating an example process for providing targeted advertising on food/beverage preparation or dispensing machines involving advertising impression compensation.

Referring next to FIG. 2B, the flow chart illustrates an example process for providing targeted advertising on food/beverage preparation or dispensing machines involving advertising impression compensation. The process depicted in FIG. 2B differs from the process depicted in FIG. 2A in that additional automatic acts 211, 213 occur to record the occurrence of and provide compensation for advertisements played or provided (i.e., advertising impressions) during the dispensing of one or more beverage or food items from the food/beverage preparation or dispensing machine 101.

After the selected media and/or advertisements are played or provided 205 on an output device that is connected to, in communication with, or integrated with the food/beverage preparation or dispensing machine 101, the occurrence of the delivered advertising impression is automatically recorded 211. This record of the occurrence may be stored with other relevant data regarding the user for which it was selected and the particular beverage or food selection chosen by the user. The record may be stored locally on the food/beverage preparation or dispensing machine 101 and/or remotely communicated to and stored on other devices and databases (e.g., the user's computer, mobile device, other server, or third party computing system) over a computer or communications network via the network/communications interface 646 of the food/beverage preparation or dispensing machine 101.

Delivery of compensation for the advertising impression may then be activated 213 either by electronic communications from the food/beverage preparation or dispensing machine 101 or by electronic communications from remote devices and systems (e.g., the user's computer, mobile device, other server, or third party computing system) to which the record of the advertising impression occurrence was previously communicated. The activation 213 may be an electronic communication from the food/beverage preparation or dispensing machine 101 or by electronic communication from remote devices and systems (e.g., the user's computer, mobile device, other server, or third party computing system) and/or authorization to transfer funds, rebates, credits or subsidies to an account or accounts of one or more of: retail purchasers or owners of food or beverage items dispensed by the food/beverage preparation or dispensing machine 101, retail purchasers or owners of the food/beverage preparation or dispensing machine 101, dispensing machine 101 service providers providing access to the food/beverage preparation or dispensing machine 101, retail purchasers or owners of maintenance services and/or supplies for the food/beverage preparation or dispensing machine 101, end users or consumers of items dispensed from the food/beverage preparation or dispensing machine 101, users or lessees of the food/beverage preparation or dispensing machine 101 and/or food/beverage preparation or dispensing machine services, or other $3^{rd}$ parties or distributors providing the food/beverage preparation or dispensing machine and supplies for the use of others.

The particular amount of the funds, rebates, credits or subsidies may be related to the number and value of the advertising impressions provided by the playing or providing 205 of advertising to individual users of the food/beverage preparation or dispensing machine 101. For example, each impression provided may be valued at the cost of one beverage or food item dispensed such that the users of the food/beverage preparation or dispensing machine are effectively paying for the item dispensed by receiving advertising while waiting for their food or beverage item to be prepared and/or dispensed. However, the particular value of the advertising impression may vary and may be determined to be more or less than the cost of the service, supplies and food/items items to dispense various food or beverage items from the food/beverage preparation or dispensing machine 101. For example, particular advertising impressions targeted to users of the food/beverage preparation or dispensing machine 101 based on the received user data by the food/beverage preparation or dispensing machine 101 may be valued higher than general advertising played on the machine that is not specifically selected for any particular user.

These variations in advertising impression value generated may be reflected in the amount of compensation delivered for such advertising impressions and result in a credit or deficit in the accounts in which the compensation is tracked or to which the compensation is sent. Account credits may be further used to provide additional rebates, promotions, bonuses or coupons (either electronic or paper) for additional food or beverage items, food/beverage preparation or dispensing machine supplies, etc., to service providers or end users of the food/beverage preparation or dispensing machine 101.

During or after the recording 211 of the occurrence of the delivery of the advertising impression, the process may be waiting 209 until the food/beverage preparation and/or dispensing is completed before returning to a state to receive user input again 201 in order to repeat the process for dispensing another food item or beverage.

To obtain additional advertising impression value related to use of the food/beverage preparation or dispensing machine 101, third-party advertisements may be printed directly on the products or supplies used in the food/beverage preparation or dispensing machine 101. For example, third party advertising may be printed on the outer packaging of a coffee pod as a means of further increasing the subsidy to the coffee pod used in a food/beverage preparation or dispensing machine 101. Also, a distributor may require that only the distributor's products be used in the food/beverage preparation or dispensing machine 101 because the advertising subsidy may be intended to facilitate the sales of those products. Additionally, a distributor may license other manufacturers of similar products to sell their products "through" the device.

The distribution of the products consumed in the food/beverage preparation or dispensing machine 101 could follow existing distribution channels and processes. For example, if the food/beverage preparation or dispensing machine 101 is a single cup coffee brewer in an office location, a distributor may sell their consumable products (coffee, etc) to an office coffee service at a "wholesale" or "distributor" price. The office coffee service will, in turn, mark-up those products and sell them to the office account. The advertising revenue that the distributor receives from the sponsors for the advertisements/media that play over a distributor's network to users of the machines 101 will be paid in full or in part back to the office location (by the examples above) so that the office location may apply that income against the expenses paid to the office coffee service for the distributor's products.

Figure 2C:
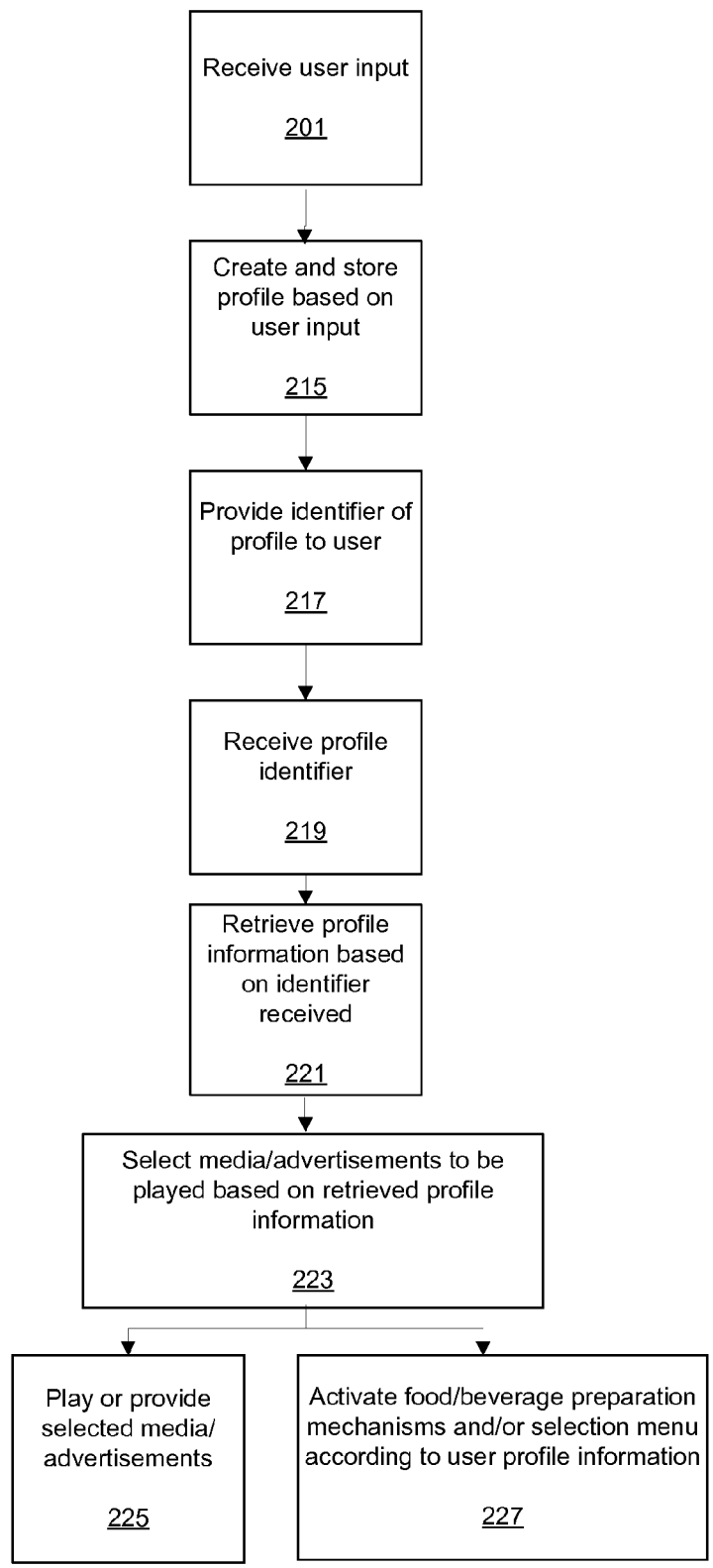
FIG. 2C is a flow chart illustrating an example process for providing targeted advertising on food/beverage preparation or dispensing machines using a user profile.

Referring next to FIG. 2C, the flow chart illustrates an example process for providing targeted advertising on food/beverage preparation or dispensing machines using a user profile. First, user input is received 201 such as user preference and/or demographic data based on which media/advertising selections will be automatically made as described above. This user input may be received 201 via a user input device operably connected to or integrated with the food/beverage preparation or dispensing machine 101 or on a remote device connected to the food/beverage preparation or dispensing machine 101 via the network/communications Interface 646.

A user profile may then be automatically created and stored 215 locally on the food/beverage preparation or dispensing machine 101 or on a remote device connected to the food/beverage preparation or dispensing machine 101 via the network/communications Interface 646. The user profile may include the received user input for future local or remote access by the food/beverage preparation or dispensing machine 101. A unique identifier of the user profile may then be provided 217 to the user that is automatically generated and associated with the user profile. The unique identifier may be a user name, number, code PIN, password or other means of identifying the user profile in a database.

The user profile identifier is then received 219 at the food/beverage preparation or dispensing machine 101, for example, by a user entering the identifier after being prompted by the food/beverage preparation or dispensing machine 101. Also, the profile identifier may be communicated remotely over a communications or computer network. For example, a user may send a text message including the profile identifier to a particular phone number associated with the food/beverage preparation or dispensing machine 101 or associated with a food/beverage preparation or dispensing machine service provider that ultimately gets routed to the food/beverage preparation or dispensing machine 101. The applicable profile information is then automatically retrieved 221 for the profile that corresponds to the profile identifier.

Once the user input is received, particular media and/or advertisements are automatically selected 223 to be played or provided on the food/beverage preparation or dispensing machine 101 based on the retrieved profile information.

The selected media and/or advertisements are then played or provided 225 on an output device that is connected to or integrated with the food/beverage preparation or dispensing machine 101 and the food/beverage preparation mechanisms and/or selection menu(s) are automatically activated 227 according to the user profile information retrieved regarding selections of beverages or food items. For example, the activated selection menu may initially display choices of beverages or food items previously selected by the user or otherwise previously indicated by the user as preferable. Also, the selection menu may be bypassed and the user's previously selected beverage automatically dispensed according to user selectable configurations stored in the user profile.

Various customized greetings, food and/or beverage selections, etc., associated with the user profile may also be communicated to the user and or used to in the automatic selection of particular beverages or items to be dispensed at the user's discretion.

Alternatively, the selected media and/or advertisements may be played or provided 225 on an output device that is remote from the food/beverage preparation or dispensing machine 101 wherein the user has provided the user profile identifier at the same remote location (e.g., on a user's computing device). Also the selected media and/or advertisements may be played or provided 225 on the user's mobile communications device, PDA, smart phone, or other device which may have been identified to the food/beverage preparation or dispensing machine 101). This may be useful in situations where the food/beverage preparation or dispensing machine 101 is configured to prepare and dispense the food or beverage automatically without needing the user to be physically present at the machine 101. An indication of the playing 225 of the advertisement or media selection at a remote location may be electronically communicated to the food/beverage preparation or dispensing machine 101 so that it may allow the activation 227 of the food/beverage preparation mechanisms and/or selection menu according to the user profile information. The user may then go to the food/beverage preparation or dispensing machine 101 to pick up their item after it is dispensed. In addition, the food/beverage preparation or dispensing machine 101 may send an alert to a computing device of the user that the item is ready to be picked up.

Also, for example, user may "opt in" for a PIN that could be entered into the food/beverage preparation or dispensing machine 101 when sponsors present opportunities to learn more or opportunities for a specific promotion. For example, upon installing the food/beverage preparation or dispensing machine 101 in an office environment, a communication such as an email, voice mail, text or the like, could be sent to all potential regular users of the beverage device offering them the chance to register for a PIN that they could voluntarily input into the food/beverage preparation or dispensing machine 101 during special promotions in order to identify themselves personally to be included in a database accessible by the sponsor. The user's PIN would be associated with their personal identifier, such as email, voice mail, text or the like and so, by entering their PIN (and therefore "opting in" to receive additional information or promotions) the user would automatically receive communications from the sponsor (by accessing the user's information in the database or directly) with the promotion, coupon, etc.

In lieu of entering a PIN in order to receive additional information or promotions via email, sponsors could present users with a text message offer to receive additional information or promotions (i.e., "text ABC to 12345 to receive more information or a special coupon").

Figure 3A:
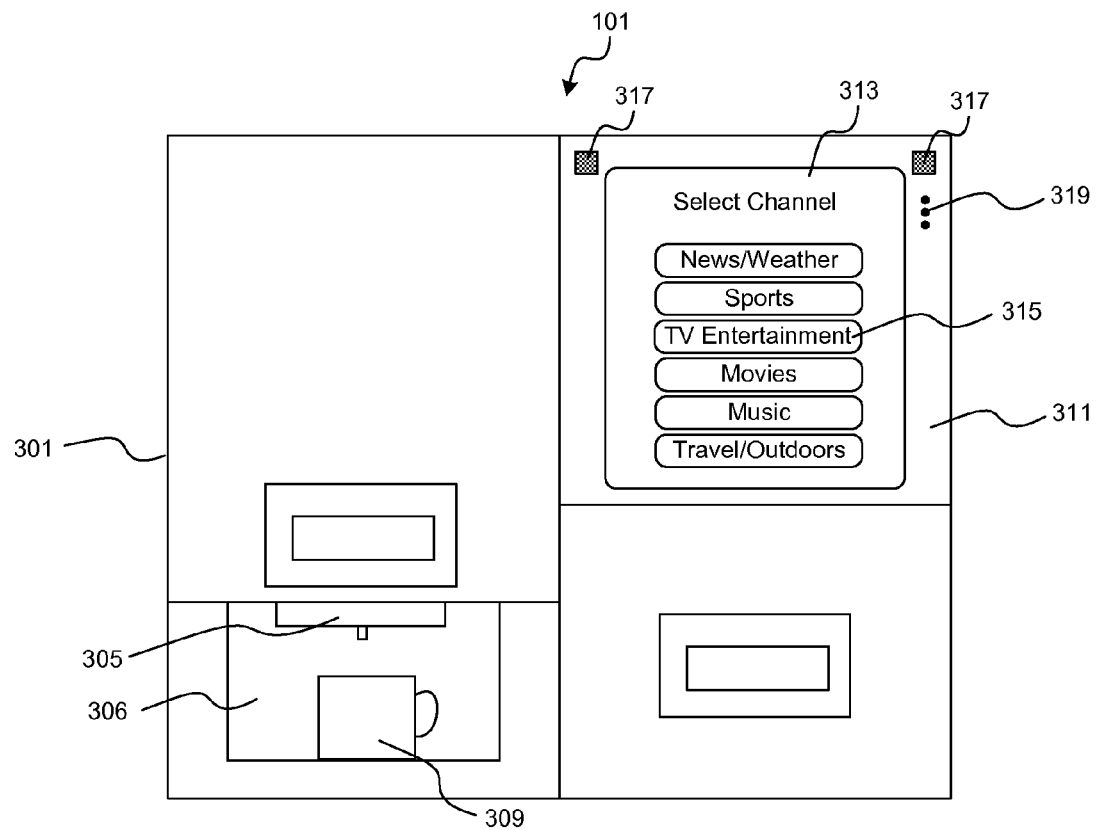
FIG. 3A is a front elevation view of an example beverage preparation and dispensing machine for providing targeted advertising.

Referring next to FIG. 3A, a front elevation view of an example beverage preparation and dispensing machine 101 for providing targeted advertising is shown. Beverage machine housing 301 has a beverage container space 306 of sufficient size to place a beverage container 309 (e.g., a coffee mug) to receive the dispensed beverage. Beverage machine dispensing mechanisms 305, a touch screen display and controller housing 311, a touch screen display 313, a plurality of touch screen buttons 315, speakers 317, audio/video (AV) output jacks 319, and other features and structures may also be provided. The touch screen display and controller housing 311 may be coupled to, attached to, formed integral with, or otherwise connected to the beverage machine mounted in or on housing 301. The touch screen display 313 may be operable for receiving selection inputs from a user as well as displaying selected media and/or advertising in the form of video or still images while the beverage dispensing mechanisms 305 dispense the selected beverage into the beverage container 309. The speakers 317 may be located within the display screen and controller housing and are operable for playing audio advertisements and media selections and/or accompanying audio of the video or still images displayed on the touch screen 313. The audio/video (AV) output jacks 319 are operable for outputting the audio and video being played on the touch screen display 313 and speakers 317 to various connected external audio and video playback devices.

In the example shown, the touch screen display is displaying a user prompt to select a channel and a number of touch screen buttons 315 providing various channels (e.g., "news/weather", "sports", "TV Entertainment", "Movies", "Music", "Travel/Outdoors") for the user to select when desiring to obtain a beverage from the beverage preparation and dispensing machine 101. Additional or different categories and channels may also be provided. When the user presses one of the touch screen buttons 315, a menu may appear allowing the user to select a beverage and preparation options (e.g., type of coffee, coffee brewing options, etc.). Once the user selects the particular beverage options, particular advertisements or media are played on the touch screen 313 and/or speakers 317 related to the channel selected while the beverage is being prepared and/or dispensed. Preferably, the length of the advertisement playing is substantially the same as the time it takes to prepare and dispense the beverage. Once the beverage is dispensed, the touch screen display may return to display the touch screen buttons 315 providing the various channel selections for the next cycle of operation.

Figure 3B:
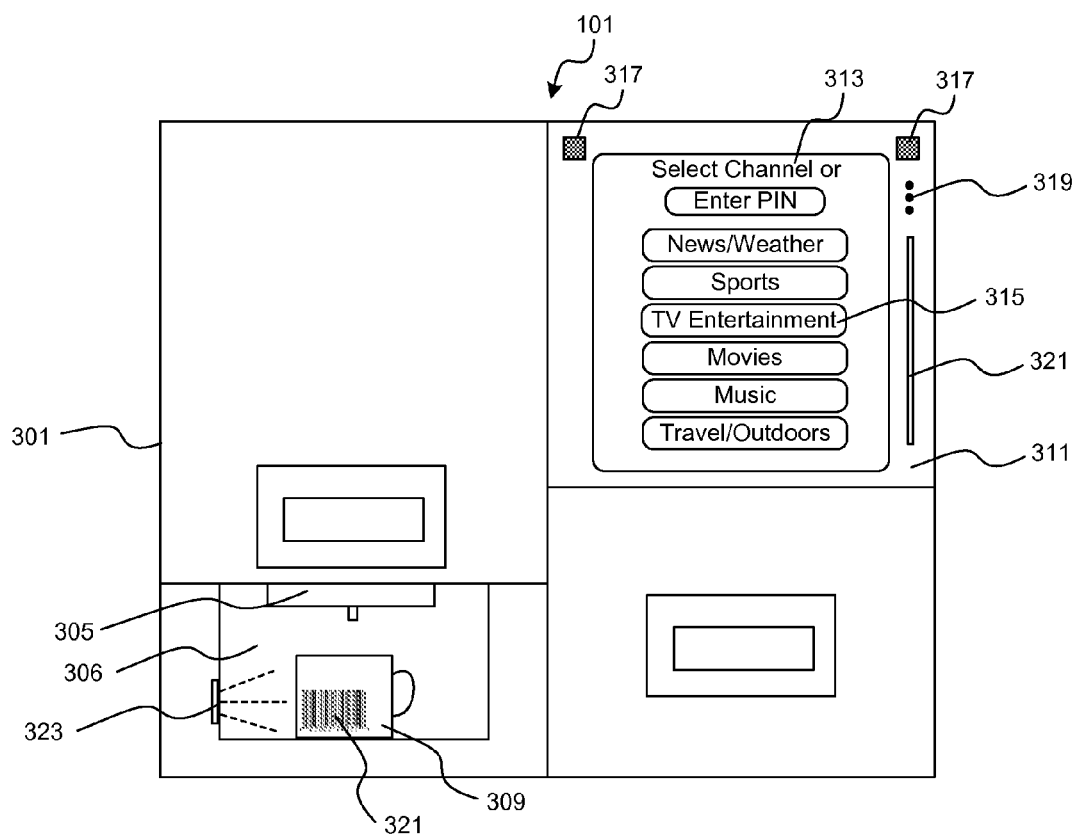
FIG. 3B is a front elevation view of the example beverage preparation and dispensing machine of FIG. 3A including additional user identification mechanisms.

Referring next to FIG. 3B, a front elevation view of the example beverage preparation and dispensing machine 101 of FIG. 3A is shown, including additional user identification mechanisms. Among the additional user identification mechanisms shown and operably coupled to the beverage preparation and dispensing machine 101 is a machine-readable symbol reader (e.g., bar code scanner) 323 operable for reading a machine-readable symbol (e.g., bar code symbol, matrix code symbol,) to identify a user (such as a bar code symbol 321 printed on a user's personal coffee mug or other beverage container 309). The machine-readable symbol reader 323 may be operably connected to the user input/peripheral Interface 644 (see FIG. 1) within the beverage preparation and dispensing machine 101 and attached to a side wall of the beverage machine housing 301 such that the bar code symbol 321 on the coffee mug 309 may be read automatically when the user places the coffee mug 309 into the beverage container space 306. Once the user is identified using the bar code symbol 321 printed on their coffee mug 309 or other item, the user's profile may be retrieved. Then advertising is automatically selected based on the retrieved profile information as described above with reference to FIG. 4 without the user having to select any of the touch screen buttons 315 to start the advertising and beverage dispensing process.

Also shown is a reader 321 that is operable for reading a magnetic strip on or memory (e.g., RFID) chip carried by a user's credit card, debit card, other card or wireless communications device (e.g., smart phone). The reader may be connected to the user input/peripheral Interface 644 (see FIG. 1) within the beverage preparation and dispensing machine 101 and be housed within the touch screen display and controller housing 311 wherein the touch screen display and controller housing 311 has a slot for insertion of a card into the reader 321. Alternatively, the reader 321 may be connected to the input/peripheral Interface 644 as a peripheral device via a cable. Once the user is identified using the reader 321 to read the magnetic strip, RFID transmission, bar code or other identification means on the user's card, the user's profile may be retrieved. Then advertising is automatically selected based on the retrieved profile information as described above with reference to FIG. 4 without the user having to select any of the touch screen buttons 315 to start the advertising and beverage dispensing process.

Figure 4:
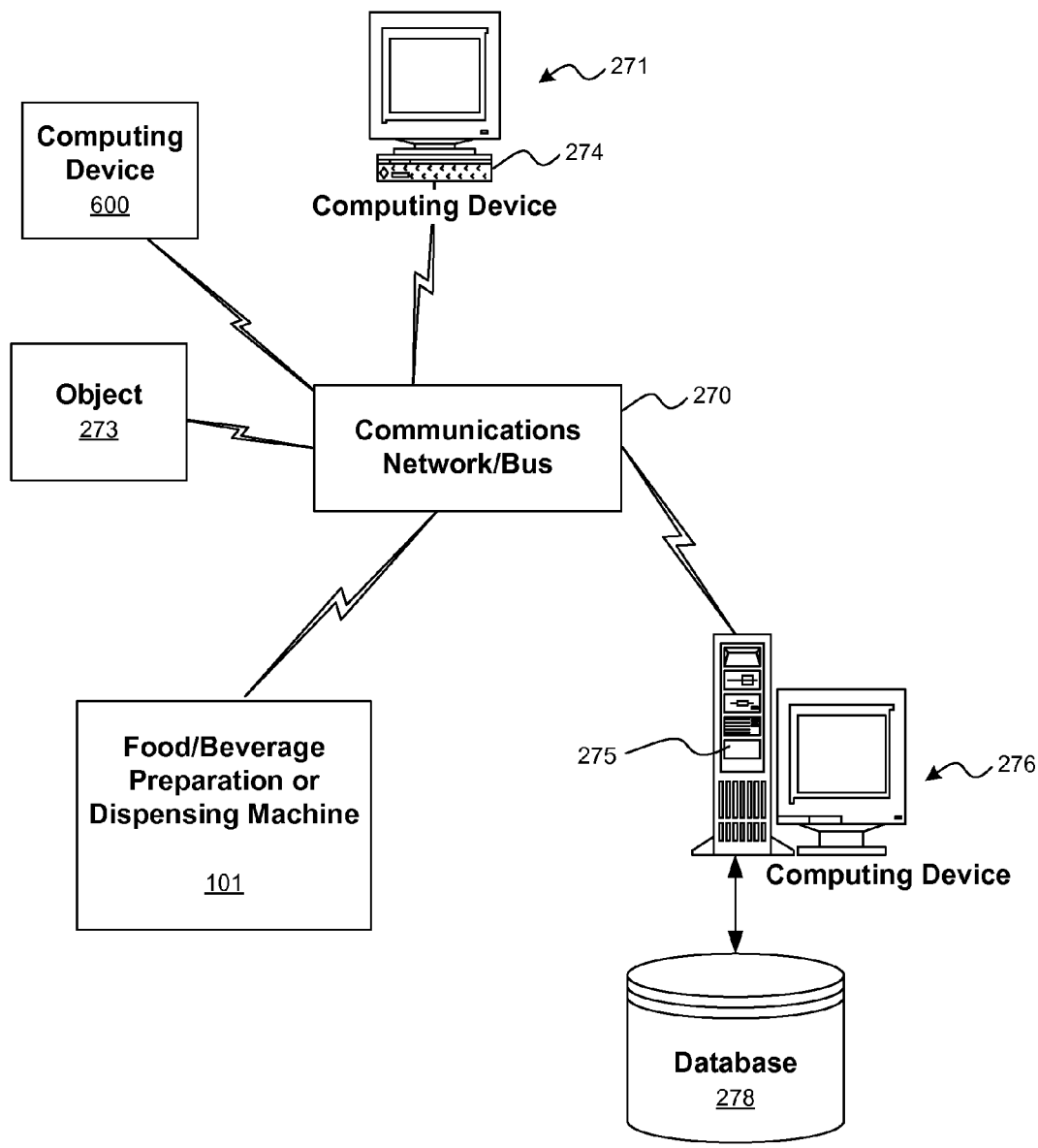
FIG. 4 is a schematic diagram of an example networked computing environment in which systems and methods for targeted advertising on food/beverage preparation or dispensing machines may be implemented.

Referring next to FIG. 4, an example networked computing environment is shown, in which many computerized processes may be implemented to provide systems and methods for targeted advertising on food/beverage preparation or dispensing machines. A food/beverage preparation or dispensing machine 101 may, for example, be in operable communication with various objects in the networked computing environment shown in FIG. 4, and one or more objects in FIG. 4 may be utilizing or implementing systems and methods for targeted advertising on food/beverage preparation or dispensing machines. As another example, distributed or parallel computing may be part of such a networked environment with various clients on the network of FIG. 4 using and/or implementing systems and methods for targeted advertising on food/beverage preparation or dispensing machines. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate processes for providing targeted advertising on food and beverage dispensing machines described herein.

The networked computing environment of FIG. 4 comprises entities such as computing devices 271, 600, 276, food/beverage preparation or dispensing machine 101, objects 273, 274, and 275, and database 278. Each of these entities 271, 600, 273, 274, 275, 276, 101 and 278 may comprise or make use of programs, methods, data stores, programmable logic, etc. The food/beverage preparation or dispensing machine 101 is the food/beverage preparation or dispensing machine 101 of FIG. 1. However, the entities 271, 600, 273, 274, 275, 276, and 278 may be the same or different networked devices such as personal digital assistants (PDAs), mobile devices, audio/video devices, MP3 players, personal computers, etc. Each entity 271, 600, 273, 274, 275, 276, 101 and 278 can communicate with another entity 271, 600, 273, 274, 275, 276, 101 and 278 by way of the communications network 270. In this regard, any entity may be responsible for the maintenance and updating of a database 278 or other storage element.

This network 270 may itself comprise other computing entities that provide services to the system of FIG. 4, and may itself represent multiple interconnected networks. In accordance with aspects of the embodiments, each entity 271, 600, 273, 274, 275, 276, 101 and 278 may contain discrete functional program modules that might make use of an application programming interface (API), or other object, software, firmware and/or hardware, to request services of one or more of the other entities 271, 600, 273, 274, 275, 276, 101 and 278.

It can also be appreciated that an object, such as 275, may be hosted on another computing device 276. Thus, although the physical environment depicted may show various connected devices as computers, such illustration is merely an example and the physical environment may alternatively be depicted or described comprising various digital devices such as PDAs, televisions, MP3 players, etc., software objects such as interfaces, COM objects and the like.

For example, the display 313 and associated network connectivity devices connected to the beverage preparation and dispensing machine 101 in may be part of the media/advertising network providing content to be played on the device, while the other parts of the beverage preparation and dispensing machine 101 may not be. Therefore, the beverage preparation and dispensing machine 101 may be purchased separately from the display and the display 313 and associated network connectivity devices may be provided by a distributor or third party service provider.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 4, any entity 271, 600, 273, 274, 275, 276, 101 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 4 and the further diversification that can occur in computing in a network environment such as that of FIG. 4, the systems and methods provided herein cannot be construed as limited in any way to a particular computing architecture.

Figure 5:
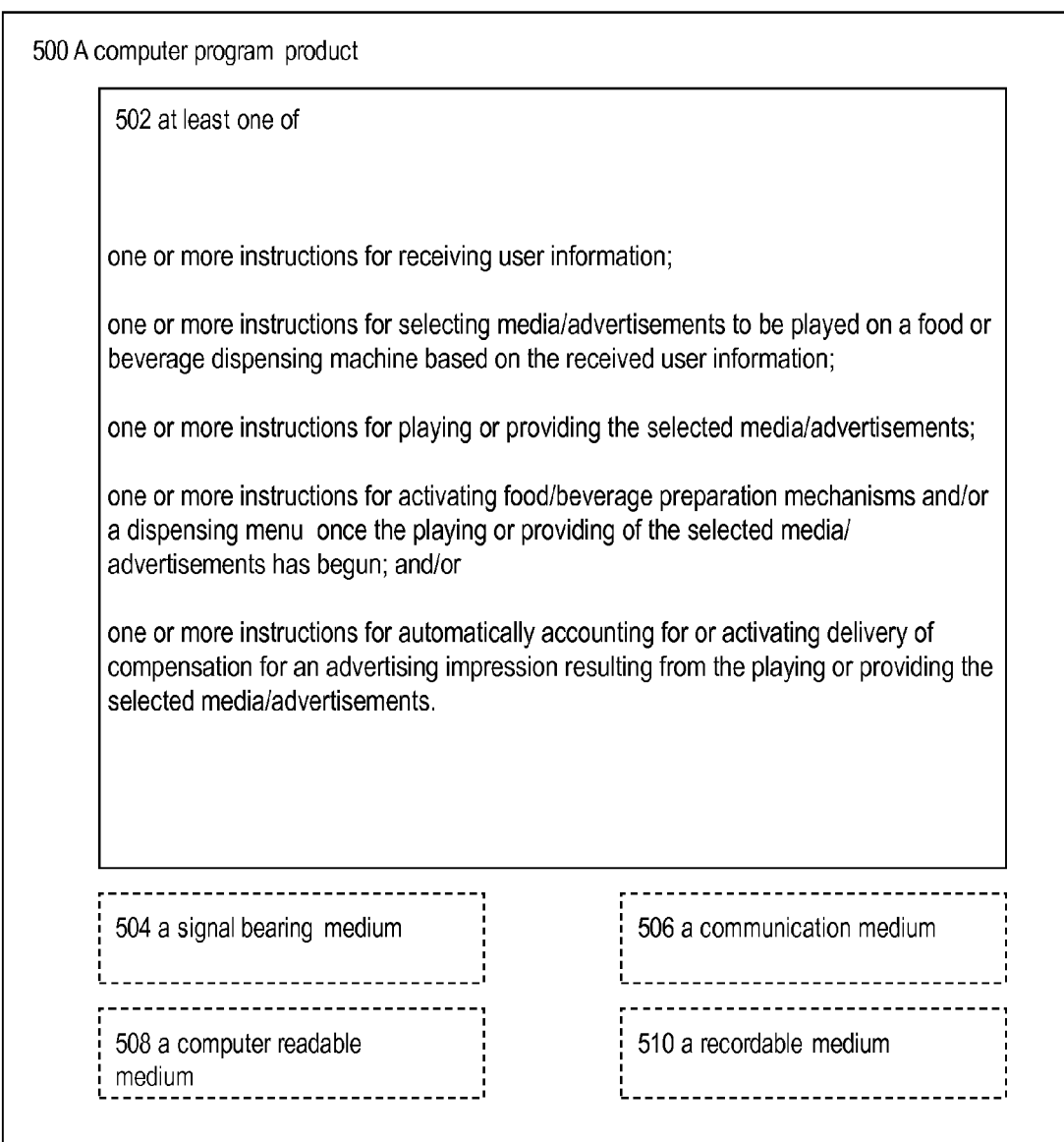
FIG. 5 is a schematic diagram illustrating a computer program product for targeted advertising on food/beverage preparation or dispensing machines.

FIG. 5 is a schematic diagram illustrating a computer program product for providing targeted advertising on food/beverage preparation or dispensing machines, arranged in accordance with at least some embodiments of the present disclosure. The computer program product 500 may include one or more sets of executable instructions 502 for executing the processes and methods described above and also illustrated in FIG. 2A through FIG. 2C. The computer program product 500 may be transmitted in a signal bearing medium 504 or another similar communication medium 506. The computer program product 500 may also be recorded in a computer readable medium 508 or another similar recordable medium 510.

Figure 6:
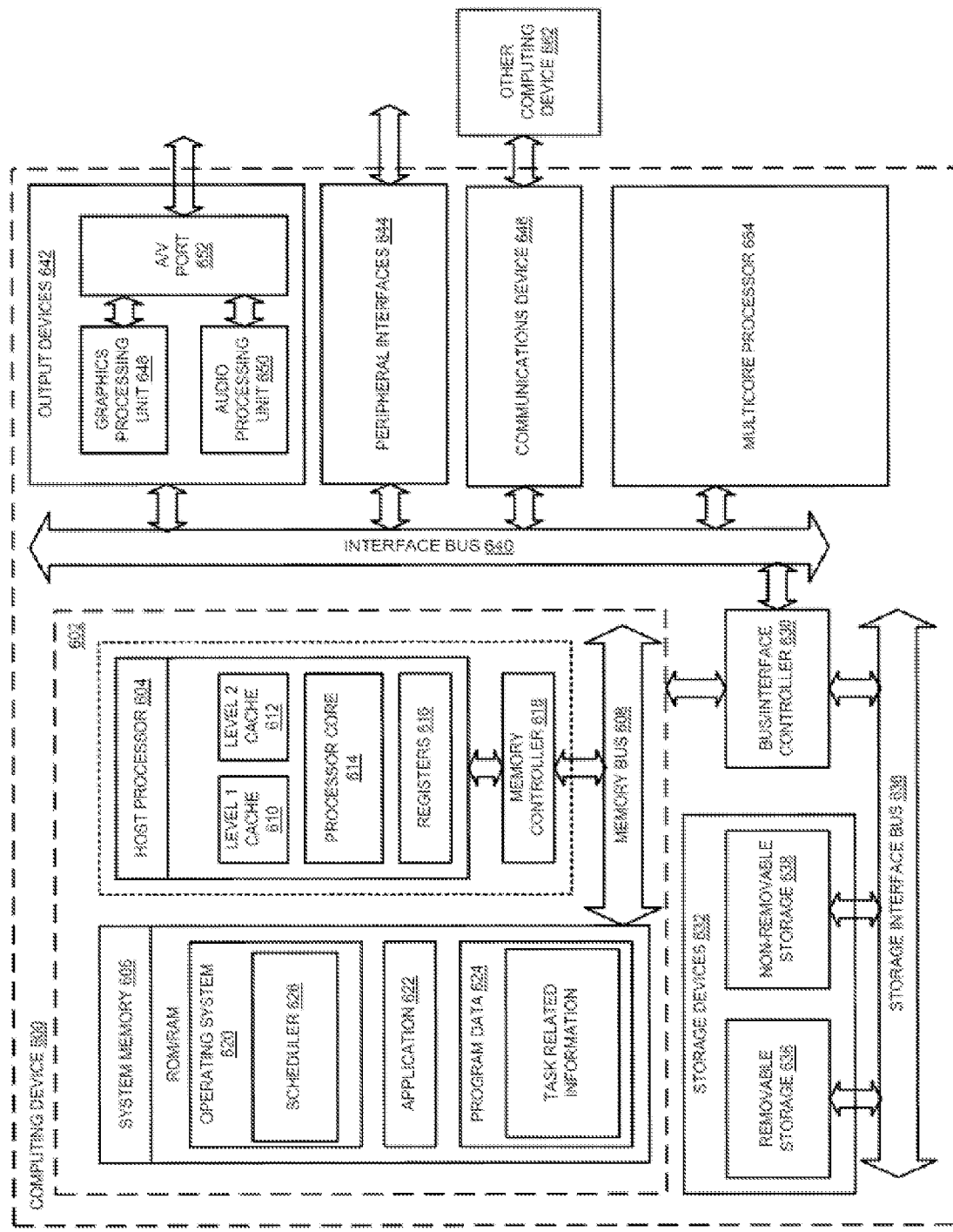
FIG. 6 is a block diagram of an example computing device on which processes and methods for targeted advertising on food/beverage preparation or dispensing machines may be implemented.

FIG. 6 is a block diagram of an example computing device on which systems, processes and methods for providing targeted advertising on food/beverage preparation or dispensing machines may be implemented, arranged in accordance with at least some embodiments of the present disclosure. In a very basic configuration, computing device 600 typically includes one or more host processors 604 and a system memory 606. A memory bus 608 may be used for communicating between host processor 604 and system memory 606.

Depending on the desired configuration, host processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. In some implementations, the operating system 620 may have a scheduler 626 and be arranged to run one or more applications 622 to perform the functions as described herein including those described with respect to at least the processes shown in FIG. 2A through FIG. 2C. Also, application 622 may be arranged to operate with program data 624 on operating system 620. Program data 624 may include task related information, such as, without limitation, task data related to executing instructions for providing targeted advertising on food/beverage preparation or dispensing machines. This basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller or a parallel interface controller, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller, which may be arranged to facilitate communications with one or more other computing devices 662 over a network communication link via one or more communication ports. In some implementations, computing device 600 includes a multi-core processor 664, which may communicate with the host processor 604 through the interface bus 640.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

There is little distinction left between hardware and software implementations of aspects of systems. The use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes, systems, or other technologies are deployed. For example, if an implementer determines that speed and accuracy are paramount, the implementer may opt for a mainly hardware or firmware vehicle. If flexibility is paramount, the implementer may opt for a mainly software implementation. Yet again, alternatively, the implementer may opt for some combination of hardware, software, with or without firmware.

Specific embodiments of systems and methods of the present invention are described below. These specific embodiments are described in detail and provided as an example of specific embodiments without limiting the generality, wide application and numerous alternative specific embodiments of the methods and systems described above.

In one specific embodiment, an ad-sponsored, single cup beverage server (e.g., coffee brewer) incorporating integrated, networked, interactive digital signage is provided. The operator of the location (office, public space, accommodation, or the like) where the server is installed may receive all or a percentage of revenue generated by operation of the device, including advertising/media revenue, up to or in excess of their expense incurred in operating the device and providing the beverage and interactive digital signage. As the beverage system is used, media and/or ad content is displayed. Interactive results (e.g., ad impressions and clicks) and conveyed to an intermediary or operating system, and sponsors are billed by the intermediary or operating system. Ad/click revenue may be enhanced when the advertisement and/or other media is targeted to specific users. And, in addition to media interactivity, the network interface may be used to track system performance, consumption data, and the like.

Users may be identified and tracked using a unique user identifier, such as a PIN (described above). Users may enter their unique PIN or otherwise identify themselves to the system and receive targeted information, advertising, media, or the like. PIN identifiers may also be used to track a user's consumption, habits, or the like, and to track the user's participation in loyalty programs and other types of qualifying events and programs.

PIN or other identifiers may also be used to connect targeted materials to specific users. Many different types of interactive user experiences and feedback may be provided using methods and systems of the present invention. Advertising or promotional material may be transmitted to specific users, or classes of users, through e-mail, text message, or another electronic format using the account information linked to the PIN or another identifier.

In one embodiment, advertising and/or media displayed to an identified user may incorporate a "SEND TO ME" feature that allows the user to interactively request more information, media content, or the like, relating to the advertisement, promotion or other media that they view on the display. The "SEND TO ME" feature may be used with or linked to advertising or other media as it is displayed to identified users. Alternatively or additionally, a "SEND TO ME" feature may be used with a passive display (e.g., when the system isn't being used by an identified user) following the user's entry of a unique user identifier. In one embodiment, material(s) selected and requested by an identified user (using a touch screen feature or entry button or the like) may be transmitted to the user via e-mail or text message, or using another electronic format. The revenue model for this feature may be according to a pay-per-click or pay-per-select model.

Figure 7:
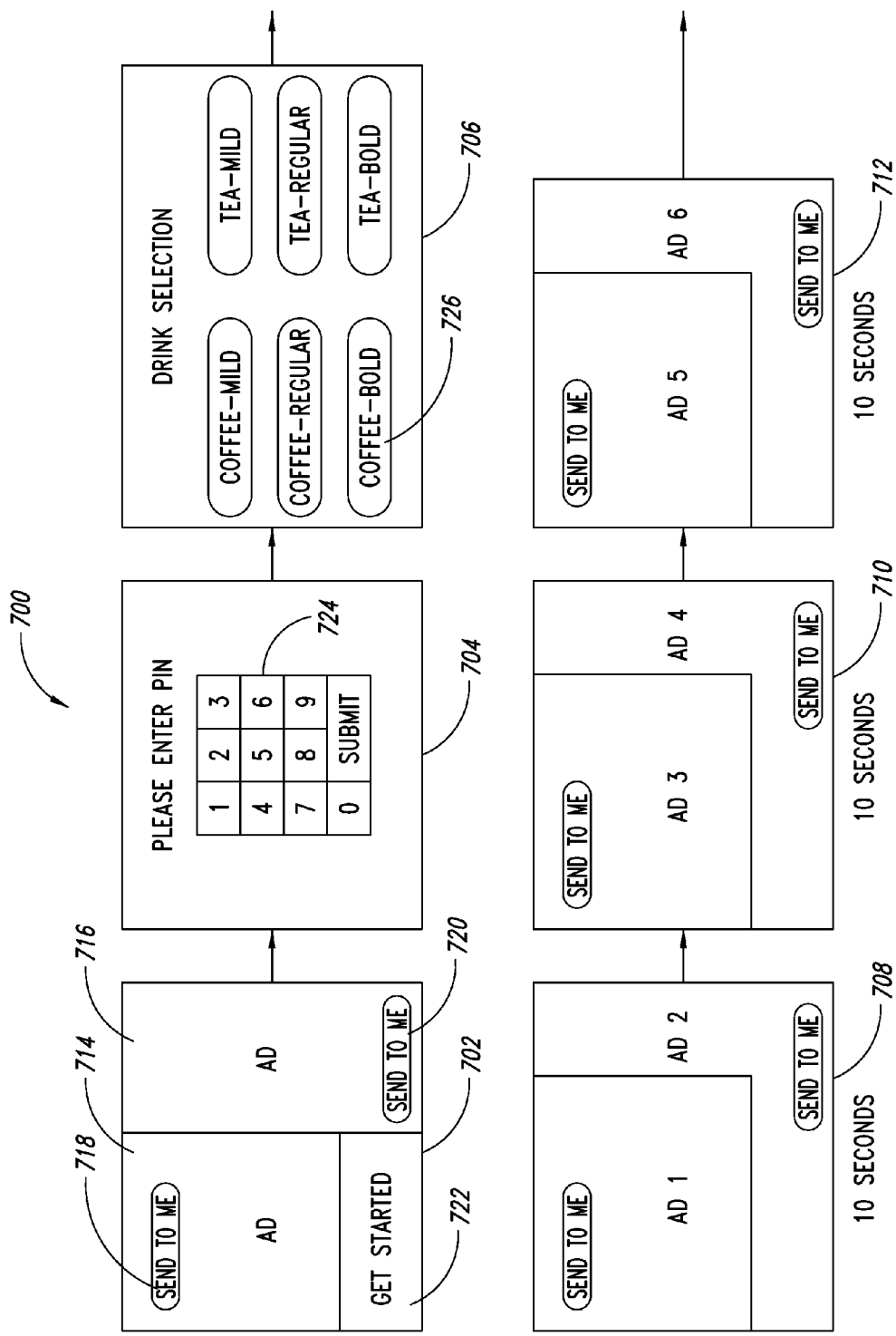
FIG. 7 is an flow chart of an example interactive user experience incorporating a "SEND TO ME" feature.

An example interactive user experience flow chart incorporating a "SEND TO ME" feature is shown in FIG. 7. In particular, shown in FIG. 7 are different items displayed to the user at different periods during an example user experience 700.

Shown are two example media pieces 714 716 (e.g., advertisements or "ads") on a display of the food/beverage preparation or dispensing machine. The two media pieces may be related or unrelated to each other and may be playing regardless of whether there was any previous user input or user detected at the food/beverage preparation or dispensing machine. Shown are two user selectable elements 718 720, each associated with a different one of the two example media pieces 714 716 that, when selected by a user, causes information related to a corresponding one of the two media pieces 714 716 to be electronically communicated to a device remote from the food or beverage preparation or dispensing machine. The two user selectable elements 718 720 may be buttons and also indicate what their functionality is by appropriate labels such as "SEND TO ME," or the like. Also shown is another user selectable element 722 that, when selected by a user, causes a prompt or menu 724 to appear.

At 702, a user selects the user selectable element 722 at which point the prompt or menu 724 appears to collect user input data to identify the user.

At 704, the user enters the user input data via the prompt or menu 724. This may be a user PIN, for example, or any other piece of information that identifies the user.

At 706, a food or beverage selection menu 726 appears and the user then selects a desired menu choice via the food or beverage selection menu 726.

At 708, two media pieces (e.g., AD 1 and Ad 2) which may be related or unrelated to each other, are selected based on retrieved user information identified from the user input and concurrently played for a pre-determined amount of time (e.g., 10 seconds). The user is given the opportunity to have information sent to them relating to the particular media pieces, such as to their mobile device or other computing device, by presenting the user selectable elements such as those as described above.

At 710 two additional media pieces are selected (e.g. AD 3 and AD 4) based on retrieved user information identified from the user input and concurrently played for a pre-determined amount of time (e.g., 10 seconds). The user is again given the opportunity to have information sent to them relating to the particular media pieces AD 3 and Ad 4, by presenting the user selectable elements such as those as described above.

At 712 yet two additional media pieces are selected (e.g. AD 5 and AD 6) based on retrieved user information identified from the user input and concurrently played for a pre-determined amount of time (e.g., 10 seconds). The user is again given the opportunity to have information sent to them relating to the particular media pieces AD 5 and AD 6, by presenting the user selectable elements such as those as described above. The total number of different media pieces selected and played is variable and may be related to the amount of time each media piece is played and the total amount of time the drink preparation and dispensing takes. Preferably, the total amount of time it takes the selected media pieces to play is substantially the same as the total amount of time the drink preparation and dispensing takes. Also, one of the two concurrently playing media pieces (e.g. AD 5 and AD 6) may be related to the other and include more specific or detailed information regarding a product being advertised in the two concurrently playing media pieces. For example, the more specific or detailed information may include location data regarding the product or information regarding how to obtain the product within a specific location surrounding the user, the user's home or the food/beverage preparation or dispensing machine.

Figure 8:
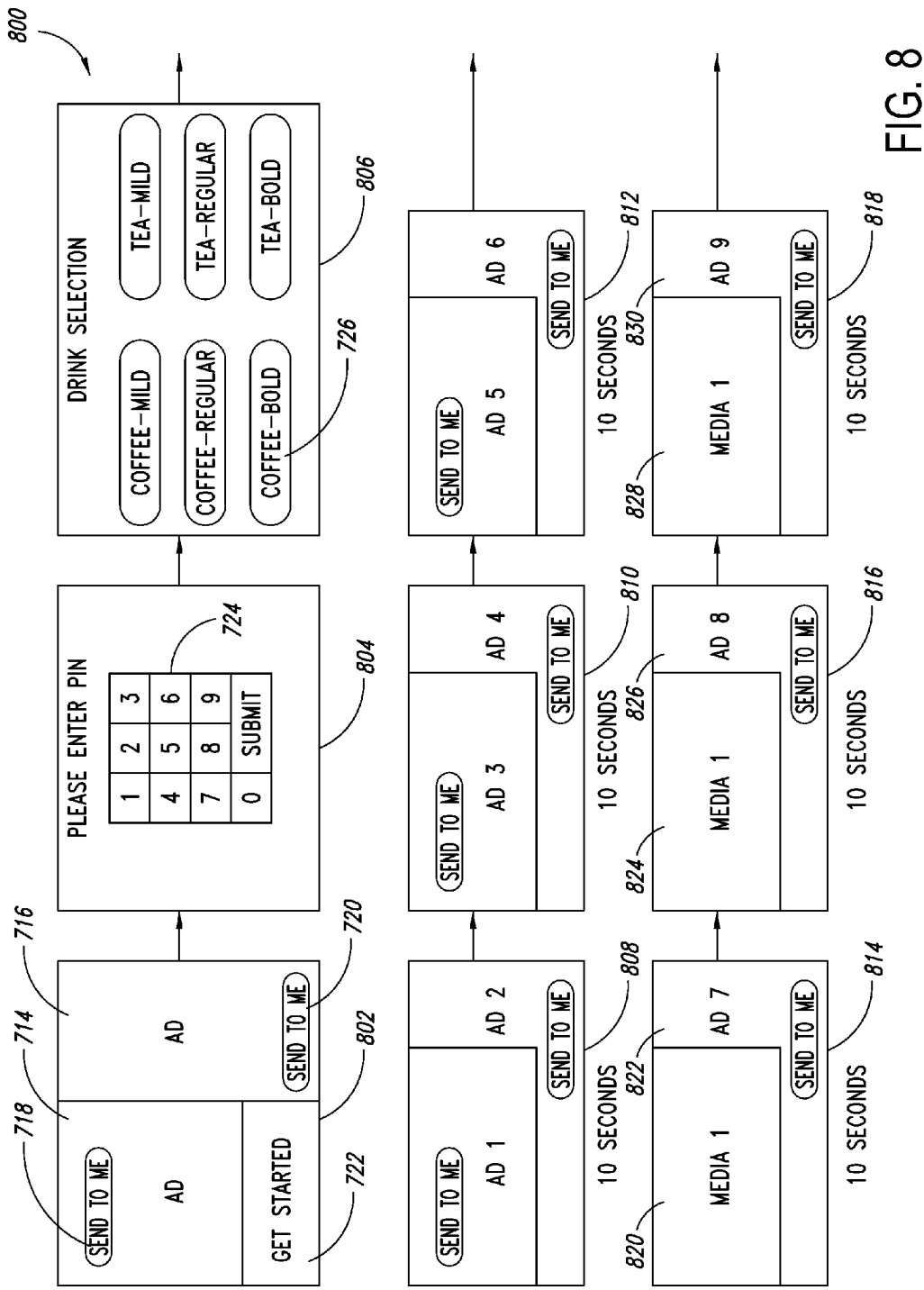
FIG. 8 is a flow chart of another example interactive user experience incorporating a "SEND TO ME" feature.

FIG. 8 is a flow chart of another example interactive user experience 800 incorporating a "SEND TO ME" feature. The interactive user experience 800 is somewhat similar to that illustrated in FIG. 7, the main difference being that after playing media pieces at 808 810 and 812, additional media pieces 820 824 and 828 are played at 814 816 and 818. The additional media pieces 820 824 and 828 may, in one embodiment, not be direct advertisements, but may be other entertaining images, videos, clips of movies, news stories, interest pieces, etc. These may be displayed, for example, concurrently with related or unrelated advertisements 822 826 and 830 (e.g., AD 7 AD 8 and AD 9) during or directly after the food or beverage has been prepared or dispensed to provide further opportunity for the user to select the applicable user selectable element 720 to invoke the "SEND TO ME" feature as described above.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

While various aspects and embodiments have been disclosed herein, other aspects and embodiments will be apparent to those skilled in the art. The various aspects and embodiments disclosed herein are for purposes of illustration and are not intended to be limiting.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for providing advertising in a system for advertising on a beverage preparation and dispensing machine, the method comprising:
   receiving input, by the system for advertising on a beverage preparation and dispensing machine, from a user or from a device of the user, wherein the system includes a computer processor and a non-transitory memory coupled to the computer processor;
   automatically selecting, by the system for advertising on a beverage preparation and dispensing machine, media to be presented to the user based on the received input;
   electronically presenting, by the system for advertising on a beverage preparation and dispensing machine, the selected media;
   automatically activating, by the system for advertising on a beverage preparation and dispensing machine, operation of one or more beverage preparation or dispensing mechanisms, or a displaying of a beverage selection menu, causing the operation or displaying to occur at least partially concurrently with the electronically presenting the selected media;
   associating, by the system for advertising on a beverage preparation and dispensing machine, a beverage dispensing cycle of the beverage preparation or dispensing mechanisms with compensation for the presenting of the selected media; and
   recording, by the system for advertising on a beverage preparation and dispensing machine, information regarding the association between the beverage dispensing cycle of the beverage preparation or dispensing mechanisms and the compensation for the presenting of the selected media.

2. The method of claim 1 wherein the automatically activating operation of the one or more beverage preparation or dispensing mechanisms, or the displaying of the beverage selection menu, is based on the received input.

3. The method of claim 1 wherein the automatically activating operation of the beverage preparation, or dispensing mechanisms or the displaying of the beverage selection menu, is triggered by the electronically presenting the selected media.

4. The method of claim 1 comprising automatically activating operation of beverage preparation or dispensing mechanisms and timing the presenting of the selected media to occur during the beverage preparation or dispensing and wherein the presenting of the selected media is caused by the activating operation of the one or more beverage preparation or dispensing mechanisms.

5. The method of claim 1 wherein the beverage preparation or dispensing mechanisms initiate preparation of a hot beverage.

6. The method of claim 1 wherein the electronically presenting the selected media includes delivering an advertisement and further comprising:
   recording an occurrence of the delivery of the advertisement.

7. The method of claim 6 further comprising automatically activating delivery of compensation for the delivering of the advertisement.

8. The method of claim 7 wherein the automatically activating delivery of compensation for the delivering of the advertisement comprises automatically communicating information regarding the occurrence of the delivery of the advertisement to enable a system to correlate the occurrence of the delivery of the advertisement with an amount of compensation for the delivering of the advertisement.

9. The method of claim 8 further comprising communicating along with the information regarding the occurrence of the delivery of the advertisement information identifying a user to which the advertisement was delivered.

10. The method of claim 7 wherein the automatically communicating information regarding the occurrence of the delivery of the advertisement comprises communicating the information regarding the occurrence of the delivery of the advertisement to an entity associated with placing the advertisement.

11. The method of claim 7 further comprising:
    monitoring the user's attention to the advertisement delivered; and
    determining an amount of the compensation for the delivering of the advertisement based on a level of attention resulting from the monitoring.

12. The method of claim 1 wherein the input is received at a food or beverage preparation or dispensing machine.

13. The method of claim 12 wherein the electronically presenting the selected media occurs on a display of the food or beverage preparation or dispensing machine.

14. The method of claim 12 wherein the electronically presenting the selected media occurs on a display in close proximity to the food or beverage preparation or dispensing machine.

15. The method of claim 14 wherein the display in close proximity to the food or beverage preparation or dispensing machine is a display of a wireless device of the user.

16. The method of claim 1 wherein the electronically presenting the selected media occurs on a display of the food or beverage preparation or dispensing machine or on a display in close proximity to the food or beverage preparation or dispensing machine, and the input is received at a device remote from the food or beverage preparation or dispensing machine.

17. The method of claim 1 wherein the selecting media to be played based on received input comprises:
   receiving information identifying a user;
   retrieving user profile information based on the input identifying the user; and
   selecting the media to be played based on the retrieved user profile information.

18. The method of claim 17 further comprising displaying a subset of beverage or food choice menu selections, the subset being a portion of possible beverage or food choice menu selections determined based on the retrieved user profile information.

19. The method of claim 1 wherein the received input includes a menu selection of media topics or a menu selection of food or beverages.

20. The method of claim 1 wherein the electronically presenting the selected media comprises:
   concurrently displaying a plurality of separate media pieces on one or more displays that are associated with a food or beverage preparation or dispensing machine.

21. The method of claim 20 wherein the plurality of separate media pieces include at least one advertisement and at least one other type of media.

22. The method of claim 20 further comprising providing, on a user interface, a user selectable element associated with one of the plurality of separate media pieces that, when selected by a user, causes information related to the one of the plurality of separate media pieces to be electronically communicated to a device remote from the food or beverage preparation or dispensing machine.

23. The method of claim 22 wherein the device remote from the food or beverage preparation or dispensing machine is a mobile device of the user.

24. The method of claim 22 wherein the information related to the one of the plurality of separate media pieces includes an order for an item related to the one of the plurality of separate media pieces.

25. A beverage preparation or dispensing machine comprising:
   means for electronically presenting selected media; and
   means for automatically activating operation of beverage preparation or dispensing mechanisms, or displaying of an item selection menu, causing the operation or displaying to occur at least partially concurrently with the electronically presenting the selected media;
   means for associating a beverage dispensing cycle of the beverage preparation or dispensing mechanisms with compensation for the presenting of the selected media; and
   means for recording information regarding the association between the beverage dispensing cycle of the beverage preparation or dispensing mechanisms and the compensation for the presenting of the selected media.

26. The beverage preparation or dispensing machine of claim 25 wherein the means for automatically activating one or more beverage preparation or dispensing mechanisms, or displaying of a beverage selection menu, and causing the operation or displaying to occur at least partially concurrently with the electronically presenting the selected media, comprise:
   at least one processor;
   beverage preparation or dispensing mechanisms in operable communication with the processor;
   at least one non-transitory memory operably coupled to the at least one processor; and
   a multimedia output or peripheral interface in operable communication with the at least one processor, wherein the memory has computer executable instructions thereon, that when executed, cause the processor to perform:
      automatically activating operation of beverage preparation or dispensing mechanisms, or displaying of a beverage selection menu, and causing the operation or displaying to occur at least partially concurrently with electronically presenting selected media based on input;
   associating a beverage dispensing cycle of the beverage preparation or dispensing mechanisms with compensation for the presenting of the selected media; and
   recording information regarding the association between the beverage dispensing cycle of the beverage preparation or dispensing mechanisms and the compensation for the presenting of the selected media.

27. The beverage preparation or dispensing machine of claim 26 wherein the presenting of the selected media occurs during beverage preparation or dispensing caused by activating the beverage preparation or dispensing mechanisms.

28. The beverage preparation or dispensing machine of claim 26 wherein the computer executable instructions, when executed, cause the processor to select the selected media based on input by:
   receiving information identifying a user;
   retrieving user profile information based on the input identifying the user; and
   selecting the media to be played based on the retrieved user profile information.

29. The beverage preparation or dispensing machine of claim 26 wherein the retrieving user profile information includes retrieving user profile information from a device remote from the beverage preparation or dispensing machine.

30. A non-transitory computer readable medium having computer executable instructions thereon, that when executed, cause a computer processor to perform:
   electronically presenting selected media; and
   automatically activating operation of one or more beverage preparation or dispensing mechanisms, or displaying of a beverage selection menu, and causing the operation of the one or more beverage preparation or dispensing mechanisms or the displaying of beverage selection menus at least partially concurrently with the electronically presenting the selected median;
   associating, by the system for advertising on a beverage preparation and dispensing machine, a beverage dispensing cycle of the beverage preparation or dispensing mechanisms with compensation for the presenting of the selected media; and
   recording, by the system for advertising on a beverage preparation and dispensing machine, information regarding the association between the beverage dispensing cycle of the beverage preparation or dispensing mechanisms and the compensation for the presenting of the selected media.

31. The non-transitory computer readable medium of claim 30 wherein the electronically presenting the selected media comprises concurrently displaying a plurality of separate media pieces on one or more displays that are associated with a food or beverage preparation or dispensing machine.

32. The non-transitory computer readable medium of claim 31 wherein the plurality of separate media pieces include at least one advertisement and at least one other type of media.

33. The non-transitory computer readable medium of claim 31 wherein automatically activating the displaying of the item selection menu comprises:

provingi, on a user interface, a user selectable element associated with one of the plurality of separate media pieces that, when selected by a user, causes information related to the one of the plurality of separate media pieces to be electronically communicated to a device remote from the food or beverage preparation or dispensing machine.

34. The non-transitory computer readable medium of claim 30 wherein the computer-executable instructions, when executed, further cause the computer processor to:
receive input; and
select the selected media based on the received input.

35. The non-transitory computer readable medium of claim 30 wherein the association between the beverage dispensing cycle of the beverage preparation or dispensing mechanisms and the compensation for the presenting of the selected media is the occurrence of the presenting of the selected media associated with the causing operation of the one or more beverage preparation or dispensing mechanisms to occur at least partially concurrently with the electronically presenting the selected media.

36. The non-transitory computer readable medium of claim 30 wherein the selected media is selected based on a user selection regarding types of media.

* * * * *